United States Patent [19]

Depew

[11] E Re. 31,117

[45] Reissued Jan. 4, 1983

[54] RIBBON CASSETTE WITH BI-COLOR CAPABILITY

[75] Inventor: Noel F. Depew, Wichita, Kans.

[73] Assignee: NCR Corporation, Dayton, Ohio

[21] Appl. No.: 59,864

[22] Filed: Jul. 23, 1979

Related U.S. Patent Documents

Reissue of:

[64] Patent No.: 4,088,218
Issued: May 9, 1978
Appl. No.: 731,404
Filed: Oct. 12, 1976

[51] Int. Cl.[3] ..... B41J 33/14

[52] U.S. Cl. ..... 400/208; 400/196.1; 400/212

[58] Field of Search ..... 400/196, 196.1, 208, 400/208.1, 212, 216, 216.1, 235.1, 242, 248

[56] References Cited

U.S. PATENT DOCUMENTS

| | | | |
|---|---|---|---|
| 2,873,015 | 2/1959 | Gray | 400/208.1 |
| 2,883,029 | 4/1959 | Gray | 400/208 |
| 3,151,724 | 10/1964 | Ross et al. | 400/208.1 |
| 3,272,304 | 9/1966 | Morelli | 400/242 X |
| 3,396,828 | 8/1968 | Moshier et al. | 400/208.1 |
| 3,643,777 | 2/1972 | Anderson et al. | 400/208 |
| 3,643,779 | 2/1972 | Anderson et al. | 400/248 X |
| 3,777,871 | 12/1973 | Zeamer | 400/248 X |
| 3,799,315 | 3/1974 | Stewart | 400/248 X |
| 3,830,351 | 8/1974 | Cappotto | 400/248 X |
| 3,897,867 | 8/1975 | Shattuck et al. | 400/208 |
| 3,899,065 | 8/1975 | Brignole | 400/208 |
| 3,904,016 | 9/1975 | Hengelhaupt | 400/216 X |
| 3,904,017 | 9/1975 | Frechette | 400/208 X |
| 3,904,018 | 9/1975 | Denley | 400/235.1 X |
| 4,003,460 | 1/1977 | Gray et al. | 400/248 X |
| 4,156,573 | 5/1979 | Anderson et al. | 400/196 X |

*Primary Examiner*—Ernest T. Wright, Jr.
*Attorney, Agent, or Firm*—J. T. Cavender; Wilbert Hawk, Jr.; George J. Muckenthaler

[57] ABSTRACT

A ribbon cassette having a body portion and a nose portion which pivots with respect to the body portion to obtain bi-color printing capability. The cassette also includes hinges and a fracturable member interconnecting the body portion and the nose portion. The fracturable member retains the nose portion in fixed relationship with respect to the body portion; however, upon removing the fracturable member, the nose portion is free to pivot between first and second positions with respect to the body portion and thereby present first and second colors of inked ribbon to an associated print means.

17 Claims, 3 Drawing Figures

RIBBON CASSETTE WITH BI-COLOR CAPABILITY

Matter enclosed in heavy brackets [ ] appears in the original patent but forms no part of this reissue specification; matter printed in italics indicates the additions made by reissue.

BACKGROUND OF THE INVENTION

This invention relates to a cassette for storing an inked ribbon in which the cassette may be operated in a first mode when a single "color" ribbon is used, and a second mode when a "bi-color" ribbon is used so as to obtain, for example, bi-color printing capability.

Some of the problems with prior art ribbon shifting mechanisms which are used to obtain bi-color printing capability are that they are generally complex, expensive to manufacture, and have a large mass which must be shifted. Some prior art ribbon shifting mechanisms are shown in U.S. Pat. Nos. 3,897,867, 3,904,016 and 3,904,017.

The present invention obviates the problems mentioned in the previous paragraph in addition to realizing the usual benefits derived from ribbon cassettes, ie. low cost, ease and cleanliness of changing ribbons, etc. The cassette of this invention may be used with various business machines like accounting machines, printers, etc.

SUMMARY OF THE INVENTION

This invention relates to a ribbon cassette having a body portion, means for supporting a ribbon in an operating plane, and first and second means connecting the supporting means with the body portion. The second means is removable to enable the cassette to be operated in first and second modes. When operated in the first mode, the supporting means is fixed relative to the body portion for use with single "color" inked ribbons. Upon the removal of the second means, the cassette is enabled to permit the supporting means to shift or pivot relative to the body portion on the first means to obtain bi-color printing capability.

DETAILED DESCRIPTION OF THE INVENTION

Figure 1:
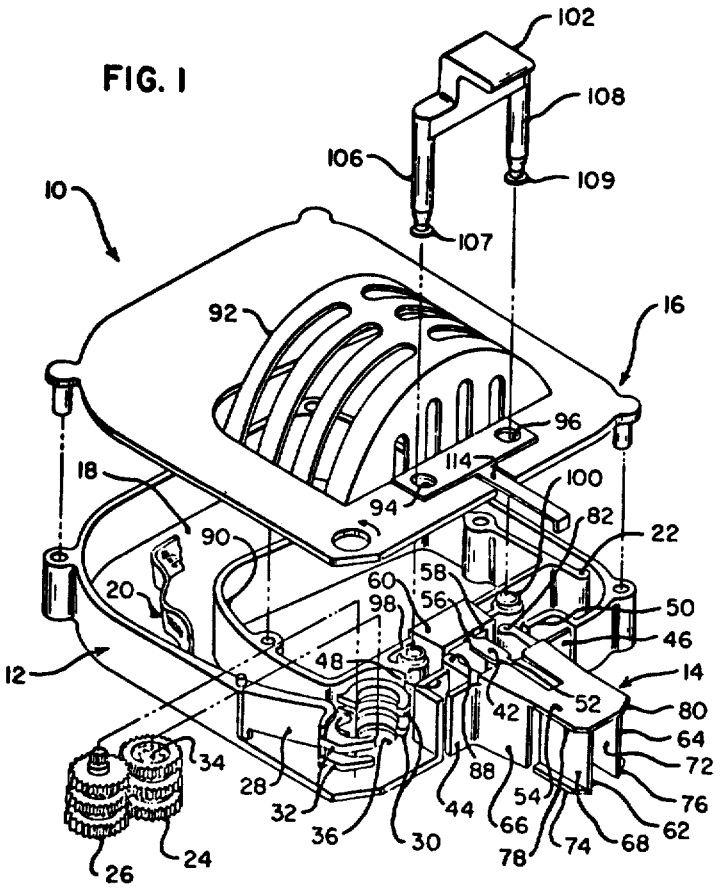
FIG. 1 is a general, exploded view, in perspective, of a ribbon cassette made according to the principles of this invention, showing a body portion, ribbon supporting means for supporting a ribbon in an operating plane, and a cover portion for the cassette.

FIG. 1 is a general, exploded view, in perspective, of a ribbon cassette designated generally as 10 and made according to the principles of this invention. The cassette 10 includes a body portion designated generally as 12, a ribbon supporting means 14, and a cover portion 16.

The body portion 12 (FIG. 1) includes a chamber 18 for storing a ribbon 20, which in the embodiment shown, is an endless ribbon which contains random convolutions or folds when stuffed into the chamber 18. The ribbon 20 exits from the chamber 18 around a post 22, is guided around the ribbon supporting means 14 (as will be described in detail hereinafter) and is returned to the chamber 18 via a feed means including a conventional drive wheel 24 and an idler wheel 26 which is resiliently biased into engagement with the drive wheel 24 by a cantilever type resilient lever spring 28. The drive wheel 24 is rotatably supported in arcuately shaped supports 30, and similarly, idler wheel 26 is rotatably supported in arcuately shaped supports 32 located on the free end of lever spring 28. The drive wheel 24 has a splined driving hole 34 therein which is aligned with a hole 36 in the body portion 12 to enable the drive wheel 24 to be driven by an external driving shaft (not shown) which is associated with the machine with which the cassette 10 is used. When the drive wheel 24 is rotated in a clockwise direction as viewed in FIG. 1, the ribbon 20 is pulled out of the chamber 18 at post 22, is pulled through the ribbon supporting means 14, and is pushed or stuffed back into the storage chamber 18.

Figure 2:
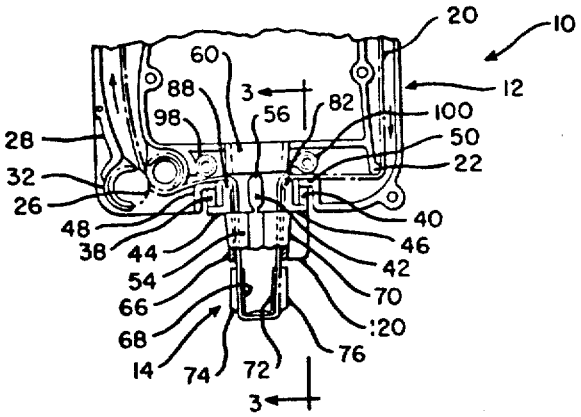
FIG. 2 is a plan view of the body portion of the cassette, and first and second means connecting the ribbon supporting means to the body portion.
Figure 3:
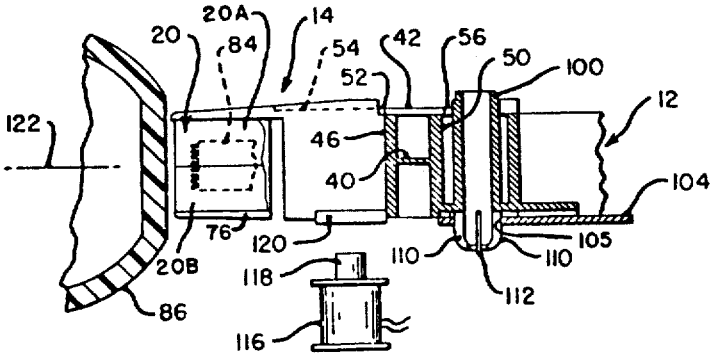
FIG. 3 is a cross-sectional view, taken along the line 3—3 of FIG. 2, to show additional details of the first and second connecting means, and the means for connecting the cassette to a utilization device like a printer.

The ribbon supporting means 14 (FIG. 2) is connected to the body portion 12 by a first means or hinge means including bar segments 38 and 40, and a second means which is a fracturable segment 42. The ribbon supporting means 14 has wall segments 44, 46 extending therefrom, and the bar segments 38 and 40 are integrally formed therewith as is best shown in FIG. 3. The opposite ends of the bar segments 38 and 40 are integrally formed with walls 48 and 50 which are part of the body portion 12. The fracturable segment 42 is planar, having a reduced, cross-sectional area 52 (FIG. 1), where it is joined to a connecting section 54, and also having a reduced, cross-sectional area 56 where it is joined to a connecting edge 58 of a joining section 60 on the body portion 12.

The ribbon supporting means 14 has channels formed on opposed sides thereof to enable the ribbon 20 to be guided to an operating plane (formed by the spaced, parallel edges 62, 64) as is best seen in FIG. 1. The channels are formed by laterally displaced walls 66, 68 (FIG. 1) and similar, laterally-displaced walls 70, 72 (FIG. 2) to enable the ribbon 20 to pass therebetween as is best shown in FIG. 2. The walls 68, 72 have lip portions 74, 76 respectively, extending slightly therefrom to support the lower edge of the ribbon 20 as it is pulled around the edges 62, 64 of these walls 68, 72 by the drive and idler wheels 24, 26. The connecting section 54 has similar lip portions 78, 80 (FIG. 1) extending from opposed sides thereof to similarly retain the upper edge of ribbon 20. The path of the ribbon 20 from post 22 in FIG. 2 is such that it passes around a post 82 (in which wall 46 terminates), inside wall 70, outside of wall 72, around the edges 64 and 62 (forming the operating plane where the ribbon 20 is supported in operative or printing relationship with a utilization device like a print means 84 and platen 86 as shown in FIG. 3), outside wall 68, inside wall 66, and around a post 88 (in which wall 66 terminates) and is then routed to the drive and idler wheels 24, 26.

The body portion 12, ribbon supporting means 14, bar segments 38 and 40 (forming the hinge means) and the fracturable segment 42 are integrally formed from a plastic material like phenelyene oxide into a single piece construction by conventional injection moulding techniques. Phenelyene oxide is a tough plastic which is manufactured, for example, by The General Electric Company and is sold under that company's trademark "Noryl"; it is a tough and flexible material without being brittle. Another satisfactory plastic material which may be used is a polycarbonate plastic which is sold under the trademark "Lexan".

The cover portion 16 (FIG. 1) is shaped to cover the body portion 12 and thereby retain the ribbon 20 in the cassette 10. In the embodiment shown, the body portion 12 has an opening 90 therein to receive the print means 84 (FIG. 3) and the cover portion 16 has an arcuately shaped section 92 formed therein for the same reason. The cover portion 16 also has holes 94 and 96 therein which are aligned with the tubular posts 98, 100, respectively, which are integrally formed with the body portion 12 to enable a "U"-shaped member 102 to secure the cover portion 16 to the body portion 12 and to a mounting plate 104 (FIG. 3). The "U"-shaped member 102 has legs 106, 108 which are received by the holes 94, 96, and by tubular posts 98, 100 (located in the body portion 12) to detachably lock the cassette 10 to the mounting plate 104 when assembled thereon. The lower ends of the tubular posts 98, 100 have sections 110, 112 which pass through matching holes 105 in the plate 104. When the "U"-shaped member 102 is inserted in the tubular posts 98, 100, the lower ends of the legs 106, 108 (which have trapezoidally shaped sections 107, 109 thereon) cause the sections 110, 112 (FIG. 3) associated with each of the tubular posts 98, 100 to expand and detachably lock the cassette 10 to the plate 104.

The cover portion 16 also has resilient means extending therefrom which means is a cantilever type leaf spring 114. The leaf spring 114 (FIG. 1) is integrally formed with the cover portion 16 and biases the ribbon supporting means 14 in a downward direction (as viewed in FIG. 1) when the fracturable segment 42 is removed.

The cassette 10 can be operated in first and second modes. In the first mode, the fracturable segment 42 is not removed, and therefore, the ribbon supporting means 14 remains fixed relative to the body portion 12 as shown in FIG. 3. Usually, a single colored inked ribbon is installed in the cassette 10 when the cassette 10 is to be operated in the first mode.

When the cassette 10 is to be operated in the second mode, a bi-colored ribbon 20 is installed in the cassette 10 and the fracturable segment 42 is removed by fracturing it. When the segment 42 is removed, the ribbon mounting means 14 is enabled to pivot on the bar segments 38, 40 between first and second positions relative to the body portion 12. The leaf spring 114 biases the ribbon supporting portion 14 in a downward direction (as viewed in FIG. 3) to bring the top half 20A or first color of the ribbon 20 into operative proximity with the print means 84 (which may be a wire matrix printer for example). When it is desired to operate the ribbon supporting means 14 in the second position to utilize the bottom half 20B or second color of the ribbon 20, the ribbon supporting means 14 is merely pushed upwardly (as viewed in FIG. 3) by an external member like a solenoid 116. When the solenoid 116 is energized, its operating plunger 118 engages a contact area 120 on the underside of the ribbon supporting means 14 to push it upwardly. In the embodiment shown, the ribbon supporting means 14 is biased downwardly below the center line 122 to the first position by an angle of about 7 degrees, and is pushed above the center line 122 to a second position by an angle of about 3 degrees by the solenoid 116. The movement of the ribbon supporting means 14 in the downward direction (as viewed in FIG. 3) is limited by the lower end of wall 46 abutting against the lower end of wall 50. The upward pivoting movement of the ribbon supporting means 14 is correspondingly limited.

While the cassette 10 has been described with regard to an inked ribbon 20, it is conceivable that the cassette 10 may store other ribbon like materials like magnetic tape or film whenever shifting is required to obtain the benefits of this invention. Also, while a ribbon cassette 10 of the stuffed ribbon type is selected to portray the invention, reel type cassettes or cassettes employing mobius loops may be employed by simply conventionally adjusting the storage chamber 18 of the cassette 10.

What is claimed is:

1. A ribbon cassette comprising:

a body portion for storing a ribbon;

a support means for supporting said ribbon in an operating plane;

first means enabling said support means to pivot with respect to said body portion; and second means connecting said support means with said body portion to selectively enable said support means to be operated in a first mode in which said support means is fixed relative to said body portion to obtain single color ribbon printing capability, and a second mode in which said support means is free to pivot via said first means to obtain bi-color ribbon printing capability;

said second means being a removable member which enables said support means to be operated in said first mode when said removable member is present and which enables said support means to be operated in said second mode when said removable member is removed.

2. The cassette as claimed in claim 1 in which said support means pivots between first and second positions when operated in said second mode and in which said cassette further includes resilient means for biasing said support means to said first position, and said support means includes a contact area to enable an external member to return said support means to said second position against the bias of said resilient means.

3. The cassette as claimed in claim 2 in which said first means comprises hinge means which are integrally formed with said support means and said body portion, and said removable member is integrally formed with said support means and said body portion and is fracturable to facilitate its removal when it is desired to operate said support means in said second mode.

4. The cassette as claimed in claim 3 in which said support means has first and second, spaced, opposed channel means thereon to facilitate the movement of said ribbon to an operating plane, and to receive a print means therebetween.

5. A cassette for an endless inked ribbon comprising:

a body portion having a chamber for storing said ribbon;

a support means for supporting said ribbon in an operating plane;

hinge means integrally formed between said support means and said body portion to enable said support means to pivot with respect to said body portion;

a fracturable member, integrally formed between said support means and said body portion to selectively enable said support means to operate in a first mode in which said support means is fixed relative to said body portion and to operate in a second mode upon the removal of said fracturable member to enable said support means to pivot between first and second positions on said hinge means;

means for feeding said ribbon from said chamber to said operating plane in said support means and for returning said ribbon to said chamber;

a cover secured to said body portion to retain said ribbon in said chamber;

said cover having a resilient means for biasing said support means to said first position when said support means is operated in said second mode; and said support means having a contact area thereon to enable an external member to return said support means when operated in said second mode to said second position against the bias of said resilient means.

6. The cassette as claimed in claim 5 in which said body portion, support means, hinge means, chamber, and fracturable member are formed into a single piece of plastic material.

7. The cassette as claimed in claim 6 in which said hinge means and said fracturable member are positioned generally perpendicularly to said operating plane.

8. The cassette as claimed in claim 7 in which said support means has first and second spaced, opposed channel means thereon to facilitate the movement of said ribbon to said operating plane and to receive a print means therebetween.

9. The cassette as claimed in claim 8 in which said hinge means comprise first and second planar segments which are positioned adjacent to said first and second channel means, respectively.

10. The cassette as claimed in claim 9 in which said first and second channel means each have first and second ribbon guide edges which cooperate with said body portion to limit the movement of said support means at said first and second positions.

11. The cassette as claimed in claim 5 in which said body portion has expandable spaced mounting lugs on one side thereof to enable said cassette to be secured to a mounting plate having holes therein to receive said mounting lugs, and further comprising a "U"-shaped member having lugs passing through said cover, body portion, and mounting lugs so as to detachably secure said cover to said body portion and said cassette to said mounting plate.

12. The cassette as claimed in claim 5 further comprising a bi-color ribbon mounted in said cassette so that a first colored portion of said ribbon is in operative proximity with a print means at said operating plane when said support means is in said first position, and a second colored portion of said ribbon is in operative proximity with said print means at said operating plane when said support means is in said second position.

*13. A ribbon cassette comprising a body portion for storing a multicolor ribbon and having a cover portion thereon, support means for supporting said ribbon in an operating plane,*

*means enabling said support means to pivot with respect to said body portion between first and second operating positions, and*

*cantilever means connected with and extending from said cover portion and biasly engageable with a surface on one side of said support means to cause said support means to be moved to a normal position and to be operated in said first operating position wherein said support means is inclined relative to said body portion to obtain printing in one color and wherein said support means includes a contact area on a side opposite said one side engageable by an external member to return said support means from said normal position against the bias of said cantilever means for operation in said second operating position to obtain printing in another color.*

*14. The ribbon cassette of claim 13 wherein said enabling means includes hinge means which are integrally formed with said support means and with said body portion.*

*15. The ribbon cassette of claim 13 wherein said cantilever means comprises an elongated resilient member integrally formed with said cover portion and biasly movable to enable operation of said support means in either said first operating position or in said second operating position.*

*16. The ribbon cassette of claim 13 wherein said cantilever means comprises a leaf spring member having a portion biasly engageable with said one side surface of said support means.*

*17. The ribbon cassette of claim 13 wherein said external member includes a solenoid for engaging the contact area of said support means.*

* * * * *